United States Patent
Schurmans et al.

(10) Patent No.: US 11,102,559 B2
(45) Date of Patent: *Aug. 24, 2021

(54) EXTENDABLE PATCH PANEL

(71) Applicants: CommScope Connectivity Belgium BVBA, Kessel-Lo (BE); ADC Czech Republic, S.R.O., Brno (CZ)

(72) Inventors: Eric Schurmans, Geetbets (BE); Jiri Ambroz, Brno (CZ); Jiri Zavrel, Leuven (BE)

(73) Assignees: CommScope Connectivity Belgium BVBA, Kessel-Lo (BE); ADC Czech Republic, S.R.O., Brno (CZ)

( * ) Notice: Subject to any disclaimer, the term of this patent is extended or adjusted under 35 U.S.C. 154(b) by 0 days.

This patent is subject to a terminal disclaimer.

(21) Appl. No.: 16/683,965

(22) Filed: Nov. 14, 2019

(65) Prior Publication Data

US 2020/0154179 A1 May 14, 2020

Related U.S. Application Data

(62) Division of application No. 15/532,908, filed as application No. PCT/EP2015/078735 on Dec. 4, 2015, now Pat. No. 10,506,306.

(Continued)

(51) Int. Cl.
*G02B 6/38* (2006.01)
*H04Q 1/02* (2006.01)
(Continued)

(52) U.S. Cl.
CPC .............. *H04Q 1/13* (2013.01); *G02B 6/3879* (2013.01); *G02B 6/3897* (2013.01); *H01R 13/518* (2013.01); *H01R 13/73* (2013.01)

(58) Field of Classification Search
CPC ........ H04Q 1/13; H01R 13/518; H01R 13/73; G02B 6/3879; G02B 6/3897
(Continued)

(56) References Cited

U.S. PATENT DOCUMENTS 10,506,306 B2 * 12/2019 Schurmans .......... H01R 13/518
2005/0233635 A1 10/2005 Denovich et al.
(Continued)

OTHER PUBLICATIONS

International Search Report and Written Opinion of the International Searching Authority for corresponding International Patent Application No. PCT/EP2015/078735 dated Feb. 24, 2016, 9 pages.

*Primary Examiner* — Jerry M Blevins
(74) *Attorney, Agent, or Firm* — Merchant & Gould P.C.

(57) ABSTRACT

An extendable telecommunications patch panel (10) is disclosed. In one aspect, the patch panel can include a plurality of interconnectable connection parts (100) for holding telecommunications connectors (12), such as adapters. Each connection part (100) may be provided with features that allow the connection parts (100) to be interlocked with each other to form the extendable patch panel (10). In one aspect, a first connection feature (122) can be located on a connection part first side (102) and a second connection feature (124) can be located on a connection part second side (104). The first connection feature (122) can be configured to interlock with the second connection feature (124) of an adjacent connection part (100). The connection part (100) may also be provided with an adapter (150) that allows the connection parts (100) to be connected in a staggered formation to result in a staggered patch panel (10).

15 Claims, 15 Drawing Sheets

Related U.S. Application Data

(60) Provisional application No. 62/088,347, filed on Dec. 5, 2014.

(51) Int. Cl.
*H01R 13/518* (2006.01)
*H01R 13/73* (2006.01)

(58) Field of Classification Search
USPC .......................................................... 385/135
See application file for complete search history.

(56) References Cited

U.S. PATENT DOCUMENTS

| | | | | |
|---|---|---|---|---|
| 2011/0085774 A1* | 4/2011 | Murphy | ............... | G02B 6/3893 385/134 |
| 2014/0334780 A1* | 11/2014 | Nguyen | ............... | G02B 6/3897 385/77 |

\* cited by examiner

EXTENDABLE PATCH PANEL

CROSS-REFERENCE TO RELATED APPLICATION

This application is a divisional of U.S. patent application Ser. No. 15/532,908, filed on Jun. 2, 2017, now U.S. Pat. No. 10,506,306, which is a National Stage Application of PCT/EP2015/078735, filed on Dec. 4, 2015, which claims the benefit of U.S. Patent Application Ser. No. 62/088,347, filed on Dec. 5, 2014, the disclosures of which are incorporated herein by reference in their entireties. To the extent appropriate, a claim of priority is made to each of the above disclosed applications.

TECHNICAL FIELD

Modular components that can be assembled to form an extendable patch panel for use in telecommunications applications are disclosed.

BACKGROUND

Patch panels that support arrays of connectors or adapters for the interconnection of telecommunications equipment are known. Typical patch panels are constructed with a predefined shape and size so as to accommodate a predetermined number of columns and rows of various types of connectors. The dimensions of a patch panel may also be defined by the structure into which the patch panel is mounted. As a result, a specifically sized patch panel is often required for each particular application. Improvements are desired.

SUMMARY

In one aspect of the disclosure, an extendable telecommunications patch panel is disclosed. The patch panel can include a plurality of interconnectable connection parts for holding telecommunications connectors, such as adapters. The connection parts can be defined as having a first side, a second side, a top end, and a bottom end. The connection part can also be defined as having a front end and a back end. The connection part can be further described as having a base portion and a frame portion. The base portion can be located at the bottom end and can extend between the first and second sides. The frame portion can extend from the base portion to the top end and can also extend between the first and second sides.

The connection part may also be provided with features that allow the connection parts to be interlocked with each other to form the extendable patch panel. In one aspect, a first connection feature can be located on the connection part first side and a second connection feature can be located on the connection part second side. The first connection feature can be configured to interlock with the second connection feature of an adjacent connection part. The connection part may also be provided with an adapter that engages with the first and second connection features to allow the connection parts to be connected in a staggered formation to result in a staggered patch panel.

DRAWINGS

DETAILED DESCRIPTION

Figure 1:
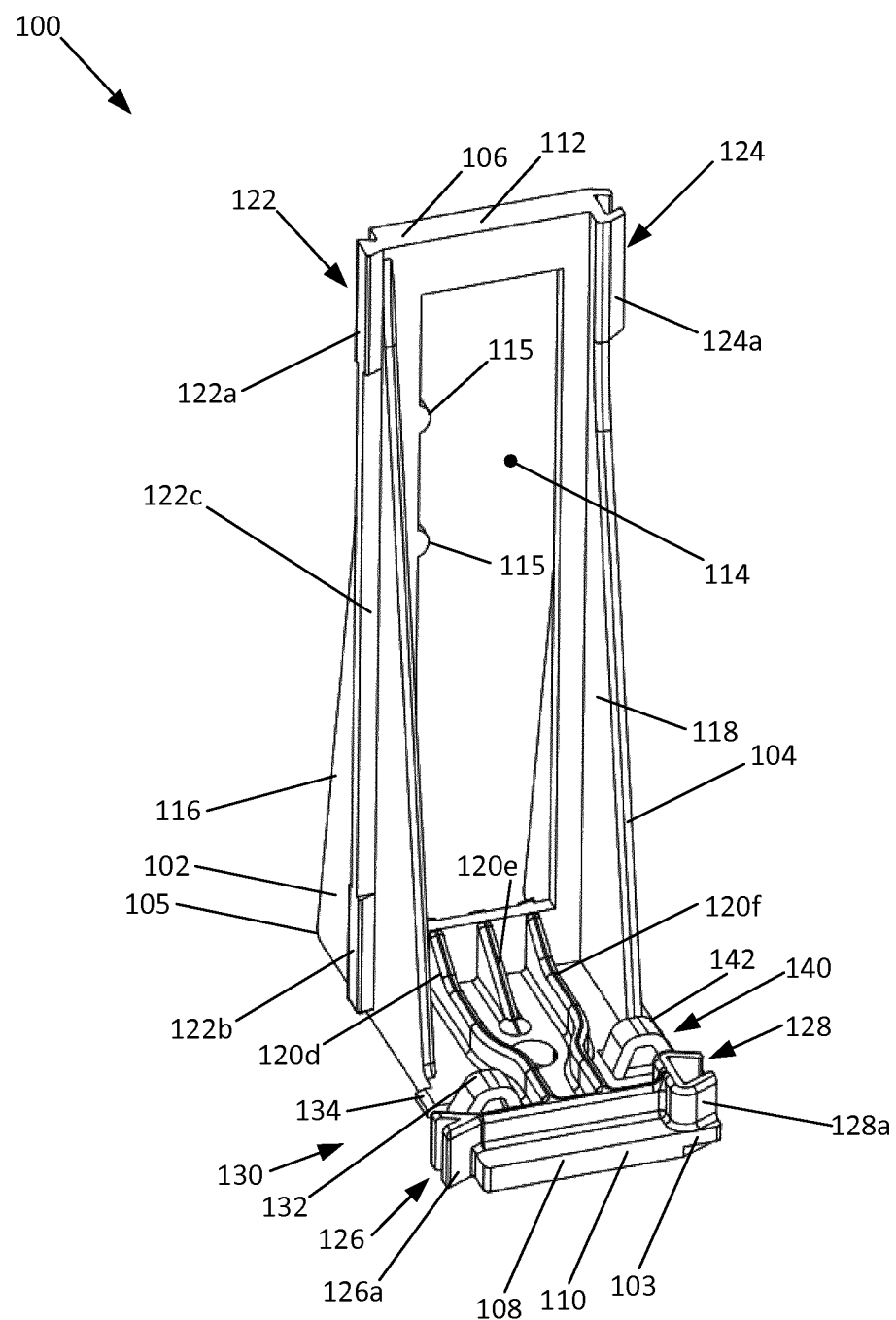
FIG. 1 is a perspective view of a connection part that can be used to form an extendable patch panel having exemplary features of aspects in accordance with the principles of the present disclosure.
Figure 2:
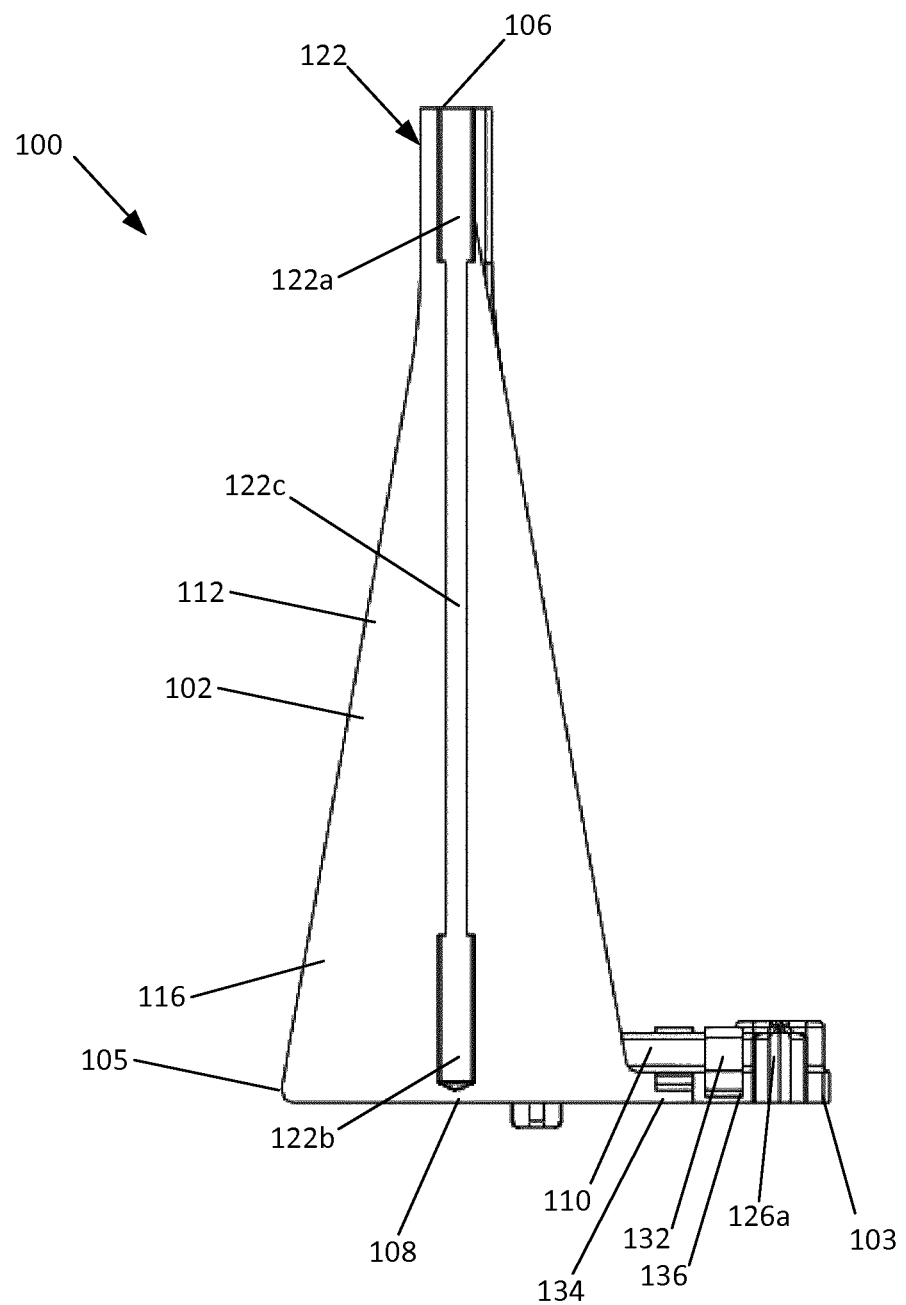
FIG. 2 is a view of a first side of the connection part shown in FIG. 1.
Figure 3:
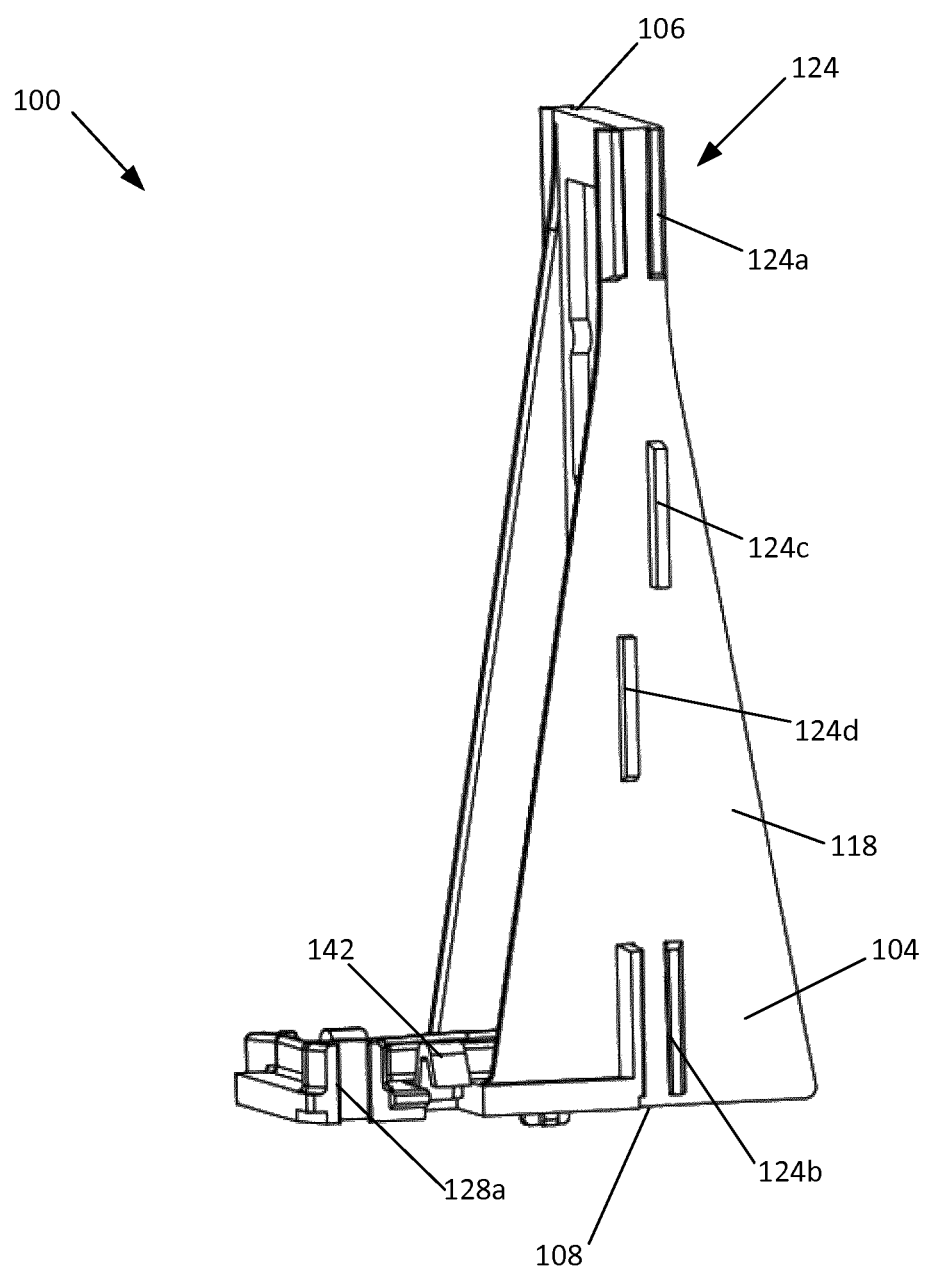
FIG. 3 is a perspective view of a second side of the connection part shown in FIG. 1.
Figure 4:
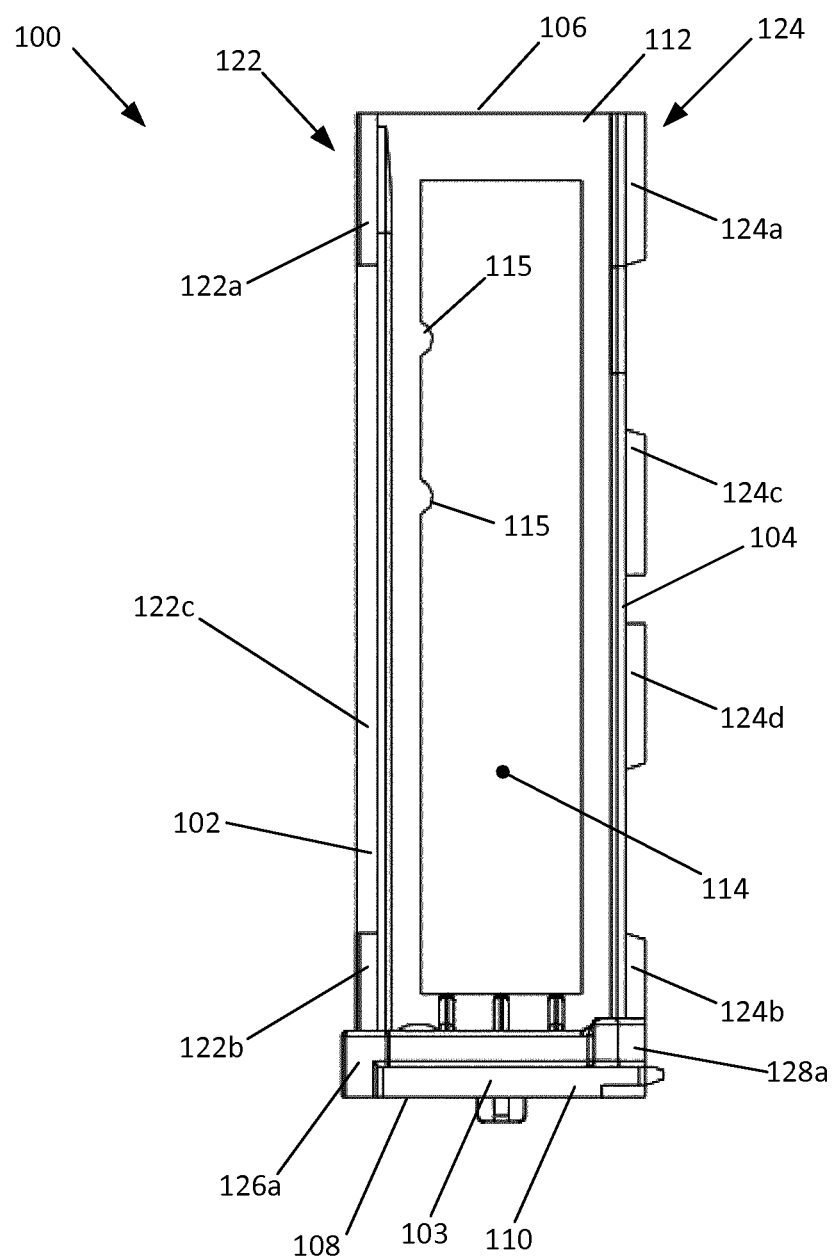
FIG. 4 is a front view of the connection part shown in FIG. 1.
Figure 5:
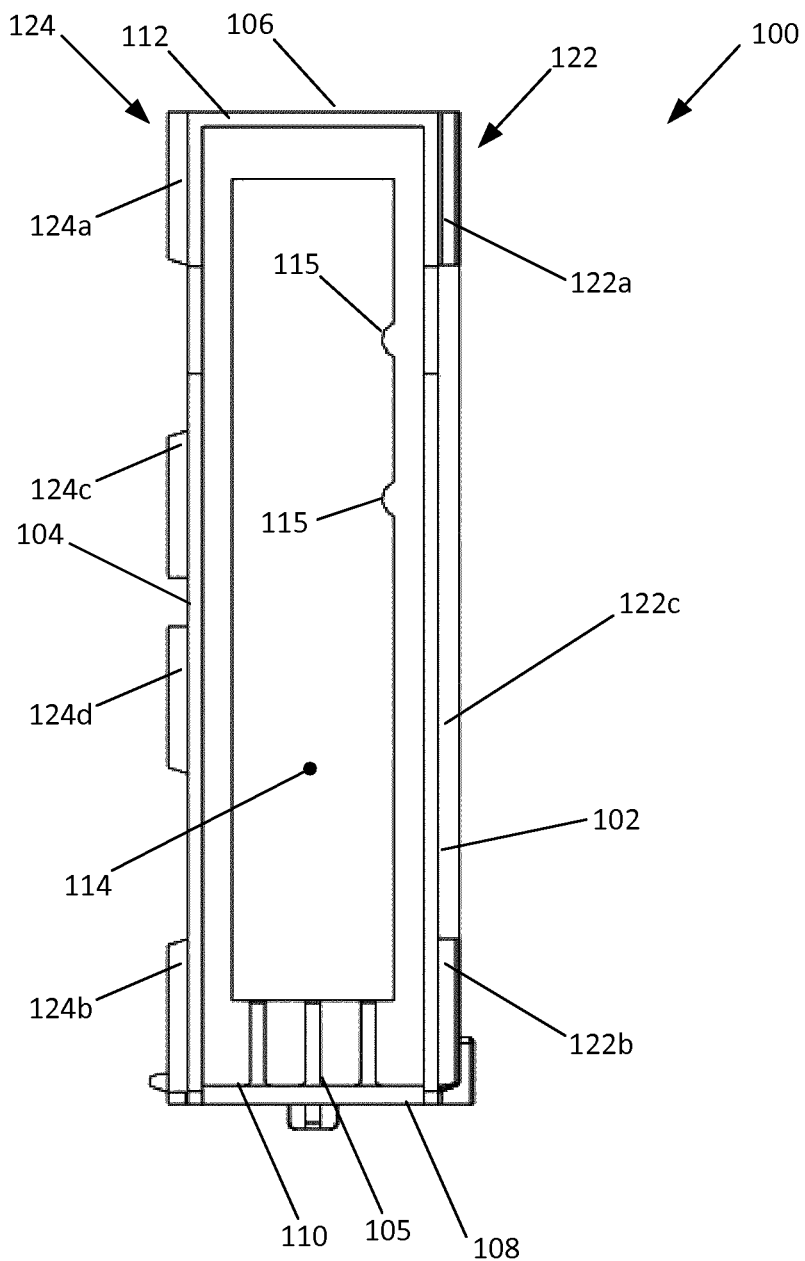
FIG. 5 is a rear view of the connection part shown in FIG. 1.
Figure 6:
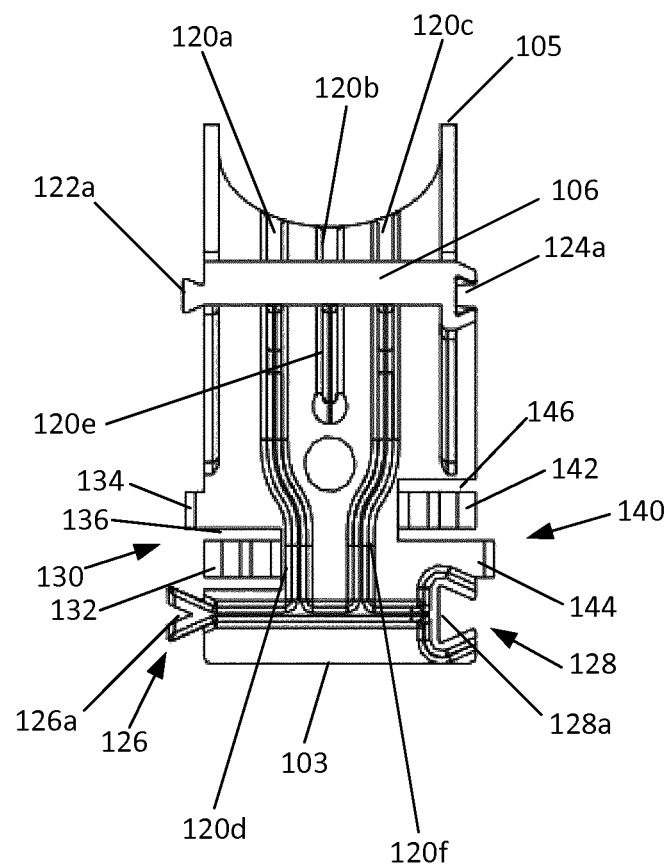
FIG. 6 is a top view of the connection part shown in FIG. 1.

Reference will now be made in detail to the exemplary aspects of the present disclosure that are illustrated in the accompanying drawings. Wherever possible, the same reference numbers will be used throughout the drawings to refer to the same or like structure.

Referring to FIGS. 1-6, a connection part 100 of an extendable patch panel 10 is shown. In one aspect, the connection part 100 defines a first side 102, an opposite second side 104, a top end 106, and a bottom end 108. The connection part 100 can also be defined as having a front end 103 and a back end 105. However, it is to be understood that terms such as "top", "bottom", "front", and "back" are simply used to provide a relative point of reference for the various features of the connection part 100 and are not intended to require a particular orientation of the connection part 100.

The connection part 100 can be formed from a base portion 110 and an adjoining frame portion 112 extending between the first and second sides 102, 104. The connection part 100 can be configured such that the frame portion 112 is disposed generally orthogonal to the base portion 110, wherein the base portion 110 defines the bottom end 108 of the connection part 100 and the frame portion 112 defines the top end 106 of the connection part 100. The frame portion 112 can be provided with an aperture 114 for holding a plurality of telecommunications components 12, such as fiber optic adapters (see FIGS. 11-15).

In one aspect, one or more retaining protrusions 115 are provided extending from a side of the frame portion 112 and into the aperture 114. The retaining protrusions 115 allow for a telecommunications component 12 to be held in an upper part of the aperture 114 which can facilitate operator access to a lower component 12 by allowing for the selective increasing of space between any two components 12. As configured, the protrusions 115 are provided with a rounded shape and deflect outward with the frame portion 112 as a component 12 is being moved past the protrusion 115. Once a component 12 is moved above the protrusion 115, the protrusion 115 retains the component 12 from below such that the component will not simply slide back in a downward direction. As shown, two retaining protrusions 115 are provided in a frame configured to hold four components 12 below the lowermost protrusion 115. As such, the spacing between the top two components 12 can be increased by raising the upper two components 12 past the first or second protrusion 115. The frame portion 112 can also be provided with a third retaining protrusion 115 if it is desired to retain the second to bottom component 12 in a raised position wherein the spacing is increased between the second to bottom component 12 and the bottom component 12. Likewise, the frame portion aperture 114 can be configured to store any number of desired components 12.

The connection part 100 can be provided with various features that enhance the overall strength of the connection part 100 and the joint between the base and frame portions 110, 112. For example, the connection part 100 can be provided with a first sidewall 116 adjoining the first side 102 of the connection part 100 at the base and frame portions 110, 112. Similarly, the connection part 100 can be provided with a second sidewall 118 adjoining the second side 104 of the connection part 100 at the base and frame portions 110, 112. The connection part 100 may also be provided with support ribs 120a to 120f extending between the base portion 110 and the frame portion 112. The sidewalls 116, 118 and the ribs 120a to 120f significantly increase the structural integrity of the connection part 100 which is advantageous as adapters 12

In one aspect, the connection part 100 can be provided with one or more connection features to enable the connection parts 100 to be connected together in a side-by-side formation to form the extendable patch panel 10. As such, the number of interconnected connection parts 100 can be selected to obtain the desired size and length of the patch panel 10.

Figure 9:
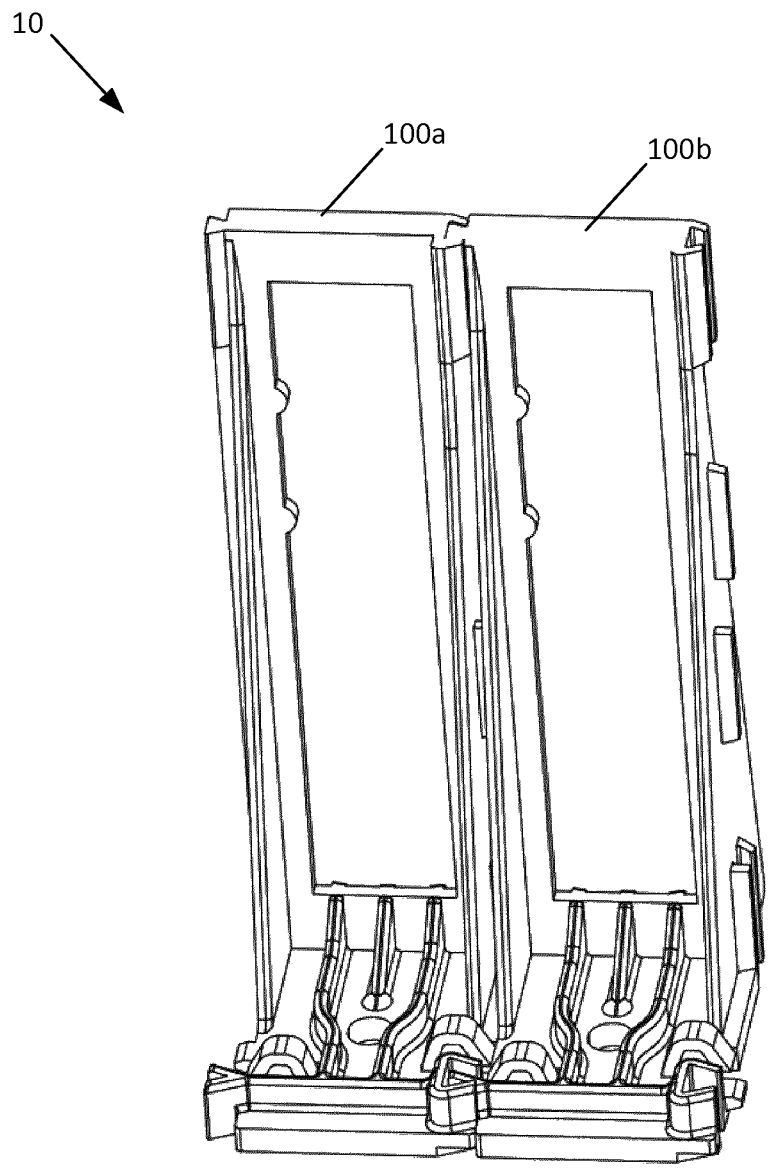
FIG. 9 is a perspective view of a first extendable patch panel constructed from multiples of the connection part shown in FIG. 1.
Figure 10:
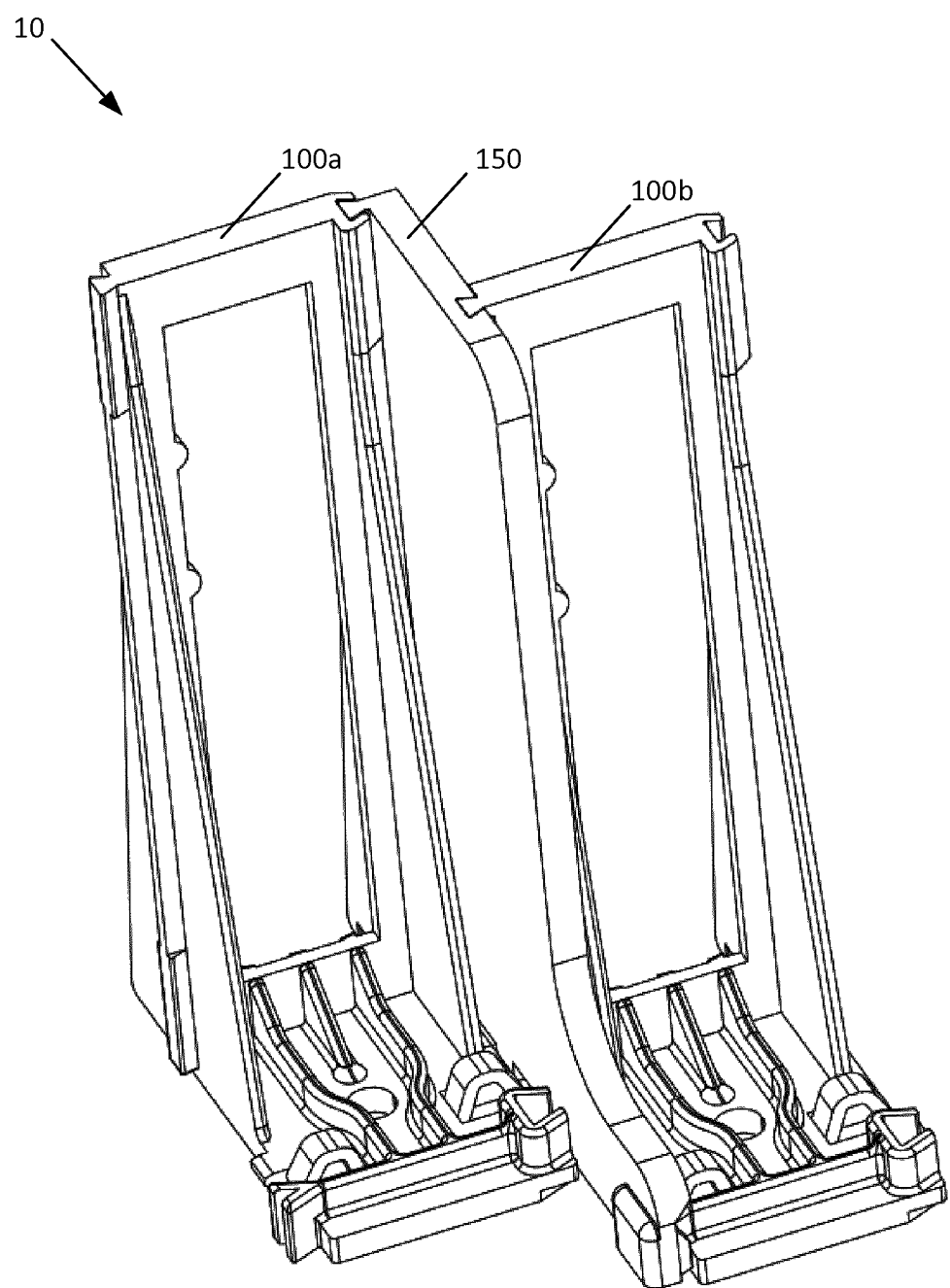
FIG. 10 is a perspective view of a second extendable patch panel constructed from multiples of the connection part shown in FIG. 1 and the adapter shown in FIG. 7.

In one example, a first connection feature 122 can be provided on the first or second side 102, 104 of the connection part 100 and a cooperating second connection feature 124 can be provided on the other of the first and second sides 102, 104. As constructed, the first connection feature 122 of one connection part 100a slidably engages with the second connection feature 124 of an adjacent connection part 100b. Such a configuration is shown at FIG. 9 where two connection parts 100a, 100b are joined. Any number of connection parts 100 can be joined together. The first and second connection features 122, 124 are configured such that they constrain the adjacent and interlocked connection parts 100a,b from moving in a lateral direction (i.e. in a direction towards or away from the first and second sides 102, 104 and parallel to an axis X) and from moving forward or backward (i.e. in a direction towards or away from the front and back ends 103, 105 and parallel to an axis Y), but are allowed to slide up and down (i.e. in a direction towards or away from the top and bottom ends 106, 108 and parallel to an axis Z).

As shown, the first connection feature 122 includes a connection portion 122a proximate the top end 106 of the connection part. Directly across from the connection portion 122a, the second connection feature 124 is shown as including a connection portion 124a. As shown, the connection portions 122a, 124a lie along the same axis (e.g. an axis parallel to axis X) such that, when joined, the connection parts 100a,b are in a side-by-side arrangement with the front and back ends 103, 105 aligned along a common axis (e.g. an axis parallel to axis X). The first connection feature 122 may also include a connection portion 122b that is similar in construction to connection portion 122a and may also include a connection portion 124b that is similar in construction to connection portion 124a. As shown, the connection portions 122b, 124b are proximate the base portion 110 at the bottom end 108. In one aspect, the connection portions on each side 102, 104 of the connection part 100 are coaxially aligned such that connection portions 122a, 122b share a common axis parallel to axis Z and connection portions 124a, 124b share a common axis parallel to axis Z.

In one aspect, the connection portions 122a, 122b are each formed as a male tail structure and the connection portions 124a, 126a are each formed as an open ended female socket structure such that the connection portions 122a, 124a can slide onto the connection portions 122a, 122b to form a dovetail joint. It should be understood that a wide variety of interlocking shapes can be used for the connection portions 122a, 124a, provided that the shapes allow for sliding engagement.

To aid in initial alignment of the connection portions 122a, 122b with connection portions 124a, 124b, an alignment structure 122c may be provided on the first side 102 of the connection part 100 while additional alignment structures 124c, 124d may be provided on the second side 104 of the connection part. As configured, the alignment structure 122c extends fully between the connection portions 122a, 122b and is disposed between the alignment structures 124c, 124d which extend partially between the connection portions 124a, 124b. In one aspect, the alignment structures 122c, 124c, 124d are formed as elongate members or ribs. Other shapes and arrangements of alignment structures are possible without departing from the concepts presented herein, provided that they allow adjoining connection parts 100 to be brought into initial alignment with each other such that the connection portions 122a, 122b can be interlocked to connection portions 124a, 124b by sliding one connection part 100a with respect to another connection part 100b along an axis parallel to the axis Z. In one aspect, the alignment structures 122c, 124c, 124d are configured such that they can engage with each other by moving the connection parts 100a,b towards each other in a lateral direction parallel to the axis X.

With the above described configuration, one connection part 100a can be aligned adjacent to another connection part 100b with the connection portions 122a, 122b of one connection part 100a above or below the connection portions 124a, 124b of the adjacent connection part 100b. As stated previously, proper alignment of the connecting parts 100a,b is ensured by the prior engagement of the alignment structures 122c, 124c, 124d. Once alignment is obtained, the upper connection part 100a can be displaced in a downward direction parallel to the axis Z until the connection portion 122a slides into the connection portion 124a and the connection portion 122b slides into the connection portion 126b to lock the connection parts 100a,b together at two distinct locations proximate the back end 105. This assembly process can be repeated until the desired number of connection parts 100 have been assembled together to form the extendable patch panel 10.

Each connection part 100 may be additionally provided with a third connection feature 126 and a fourth connection feature 128 to provide for an additional point of securement between adjoining connection parts 100 proximate the front end 103. As shown, the third connection feature 126 includes a connection portion 126a that is provided on the base portion 110 proximate the front end 103. Similarly, the fourth connection feature 128 includes a connection portion 128a provided on the base portion 110 directly across from the third connection feature 126. As shown, the connection portions 126a, 128a lie along the same axis (e.g. an axis parallel to axis X) such that, when joined, the connection parts 100 are in a side-by-side arrangement with the front and back ends 103, 105 aligned along a common axis (e.g. an axis parallel to axis X).

In one aspect, the connection portion 126a is formed as a male tail structure and the connection portion 128a is formed as an open ended female socket structure into which the connection portion 126a can slide to form a dovetail joint, in the same manner as already described for connection portions 122a/124a and 122b/124b. It should be understood that a wide variety of interlocking shapes can be used for the connection portions 126a, 128a, provided that the shapes allow for sliding engagement. In combination, the connection portions 122a/124a, 122b/124b, and 126a/128a provide for three points of contact or securement between adjacent connection parts 100.

Each connection part 100 can also be provided with a first lock feature 130 and a second lock feature 140 to prevent adjacent connection parts 100 from sliding out of engagement with each other in either direction along an axis parallel to axis Z once joined. In the example embodiment shown, the first lock feature 130 includes a first spring clip 132 and a first stop surface 134 at the connection part first side 102. The spring clip 132 is provided with a free end 132a that is disposed above a notched area 136 of the base portion 110. Similarly, the second lock feature 140 includes a second spring clip 142 and a second stop surface 144 at the connection part second side 104, wherein the second spring clip 142 is provided with a free end 142a that is disposed above a notched area 146 of the base portion 110.

The first stop surface 134 is provided with a sufficient length such that the stop surface 134 of one connection part 100 extends into the notch area 146 and below the free end 144a of an adjacent connection part 100. Likewise, the second stop surface 144 is provided with a sufficient length such that the stop surface 144 of one connection part 100 extends into the notch area 136 and below the free end 132a of an adjacent connection part 100. Thus, an interference condition exists between the spring clips 132, 142 and the respective stop surface 134, 144.

As stated previously, two connection parts 100a,b can be initially aligned with each other such that the second side 104 of a first connection part 100a is adjacent to the first side 102 of a second connection part 100b. In such an example, the first connection part 100a can be initially disposed above the second connection part 100b and then slid downwardly along an axis parallel to axis Z such that the connection portions 122a/124a, 122b/124b, and 126a/128a become engaged. As the connection parts 100 become fully aligned (e.g. the top ends 106 or bottom ends 108 are aligned), the second stop surface 144 of the first connection part 100a will initially engage with the first spring clip 132 of the second connection part 100b from above and force the spring clip free end 132a to deflect inwardly. As the first connection part 100a is further displaced downwardly, the spring clip free end 132a of the second connection part 100b will spring back or snap over the second stop surface 144 of the first stop surface 134 to prevent the first connection part 100a from subsequently being lifted back out of position in a direction towards the top end 106. At the same time or near the same time, the free end 142a of the second spring clip 142 of the first connection part 100a comes into downward contact with the first stop surface 134 of the second connection part 100b to prevent the first connection part 100a from being further displaced downwardly with respect to the second connection part 100b. Thus, the spring clips 132,142 and stop surfaces 134,144, once engaged, entirely prevent the connection part 100a from moving upwardly and downwardly along an axis parallel to the Z axis, thereby ensuring that the connection portions 122a/124a, 122b/124b, and 126a/128a cannot become disengaged. If it is desired to disengage the first connection part 100a from the second connection part 100b, the spring clip free end 132a can be manually deflected inwardly beyond the reach of the stop surface 144 whereby the first connection part 100a can then be lifted upwardly and out of engagement with the second connection part 100b. Alternatively, the second spring clip 142 can be deflected inwardly beyond the reach of the stop surface 134 to allow the first connection part 100a to be displaced downwardly and out of engagement with the second connection part 100b.

As shown in FIG. 9, the above described features result in an extendable patch panel 10 wherein each of the connection parts 100 are aligned together such that the front and back ends 103,105 are fully aligned along a common plane. However, where a staggered orientation is preferred, the relative positions of the connection features 122, 124, 126, 128 and the lock features 130, 140 on each side 102, 104 of the connection parts 100 can be offset on each side 102, 104 of the connection parts 100 to achieve such a result. It is also noted that each connection part 100 can be integrally molded or otherwise formed such that all features of the connection part 100 are formed as a single component.

Figure 7:
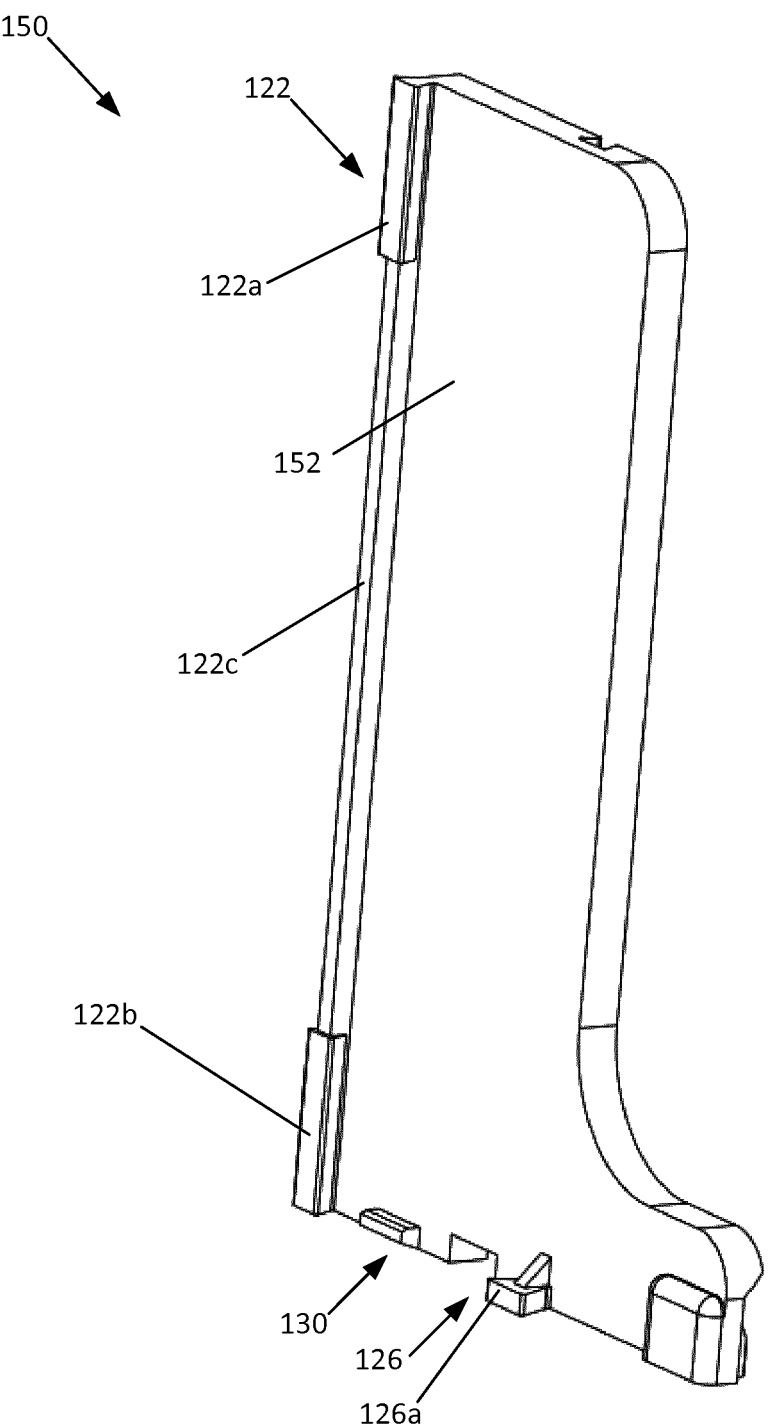
FIG. 7 is a first perspective view of an adapter that can be used to form an extendable patch panel having exemplary features of aspects in accordance with the principles of the present disclosure.
Figure 8:
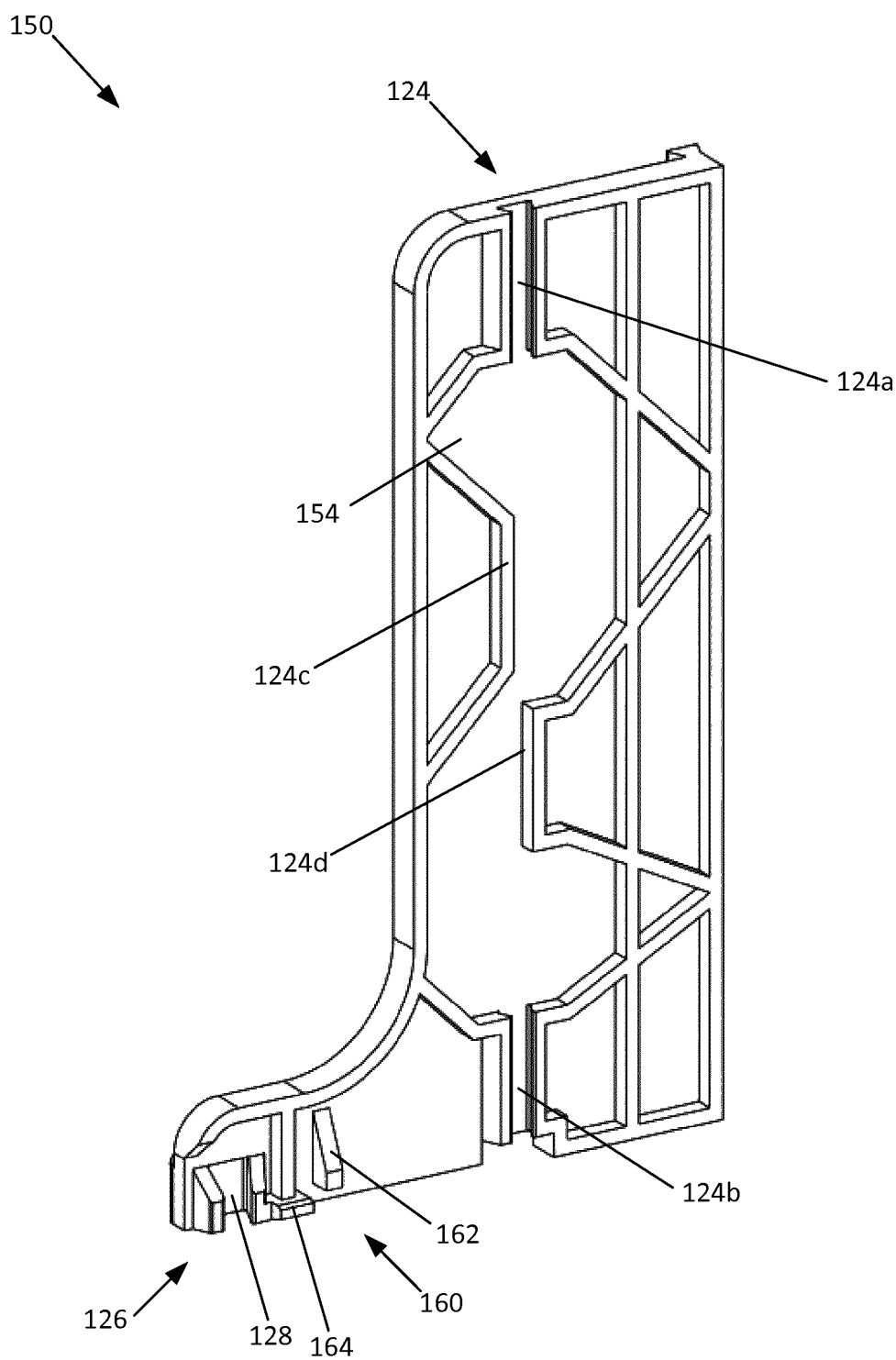
FIG. 8 is a second perspective view of the adapter shown in FIG. 7.
Figure 12:
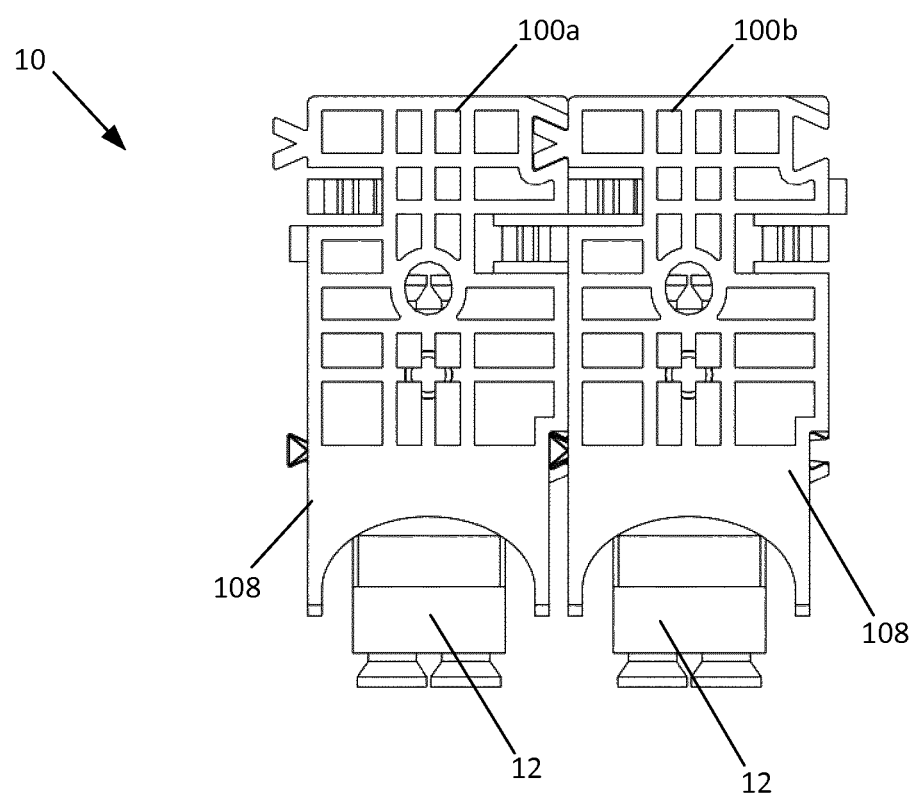
FIG. 12 is a bottom view of the first extendable patch panel shown in FIG. 11.

A staggered configuration for an extendable patch panel 10 can also be achieved using a plurality of the above described connection parts 100 with the introduction of an intermediate adapter 150. The adapter 150 is shown at FIGS. 7-8 and a staggered configuration for a patch panel 10 is shown at FIGS. 9 and 12. To achieve this function, the adapter 150 replicates the connecting, aligning, and lock features of the first side 102 of the connection part 100 on a first side 152 of the adapter 150. Likewise, the adapter 150 replicates the connecting, aligning, and lock features of the second side 104 of the connection part 100 on a second side 154 of the adapter 150, but in an offset manner.

For example, the first side 152 of the adapter 150 can be provided with the first connection feature 122 including the connection portion 122a, the connection portion 122b, and the alignment feature 122c. The first side 152 can also be provided with the third connection feature 126 including the third connection portion 126a and can be further provided with the various components of the first lock feature 130.

The second side 154 of the adapter 150 can be provided with the second connection feature 124 including the connection portion 124a, the connection portion 124b, and the alignment features 124c,d. The second side 154 can also be provided with the fourth connection feature 128 including the fourth connection portion 128a. The second side 154 can be further provided with the various components of the second lock feature 140, presented in FIG. 8 as lock feature 160. As shown, lock feature 160 has a stop surface 162 that performs the same general function as first stop surface 144 and engages with the spring clip 132 of the connection part 100. Lock feature 160 can also be provided with another stop surface 164 that replaces the spring clip 142 and engages with the stop surface 134 of the connection part 100 to prevent further downward movement of the adapter 150 with respect to the connection part 100. As such, lock feature 160 of the adapter 150 interacts with lock feature 130 of the connection part to secure the adapter 150 to the connection part 100.

Figure 11:
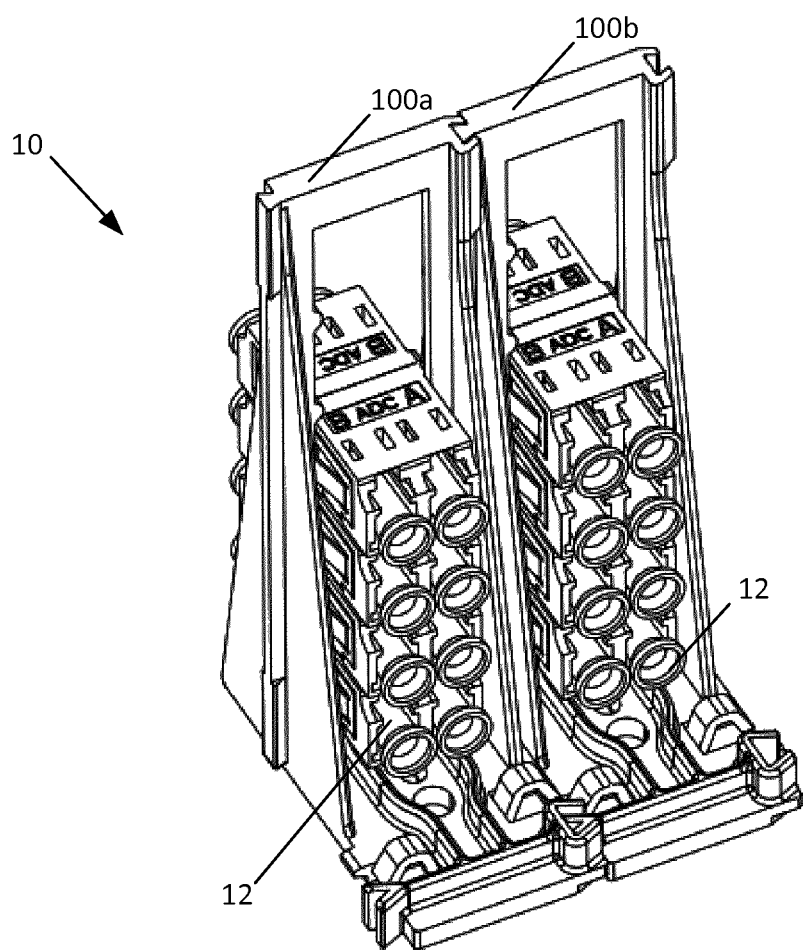
FIG. 11 is a perspective view of the first extendable patch panel shown in FIG. 9 with adapters installed into each connection part.
Figure 15:
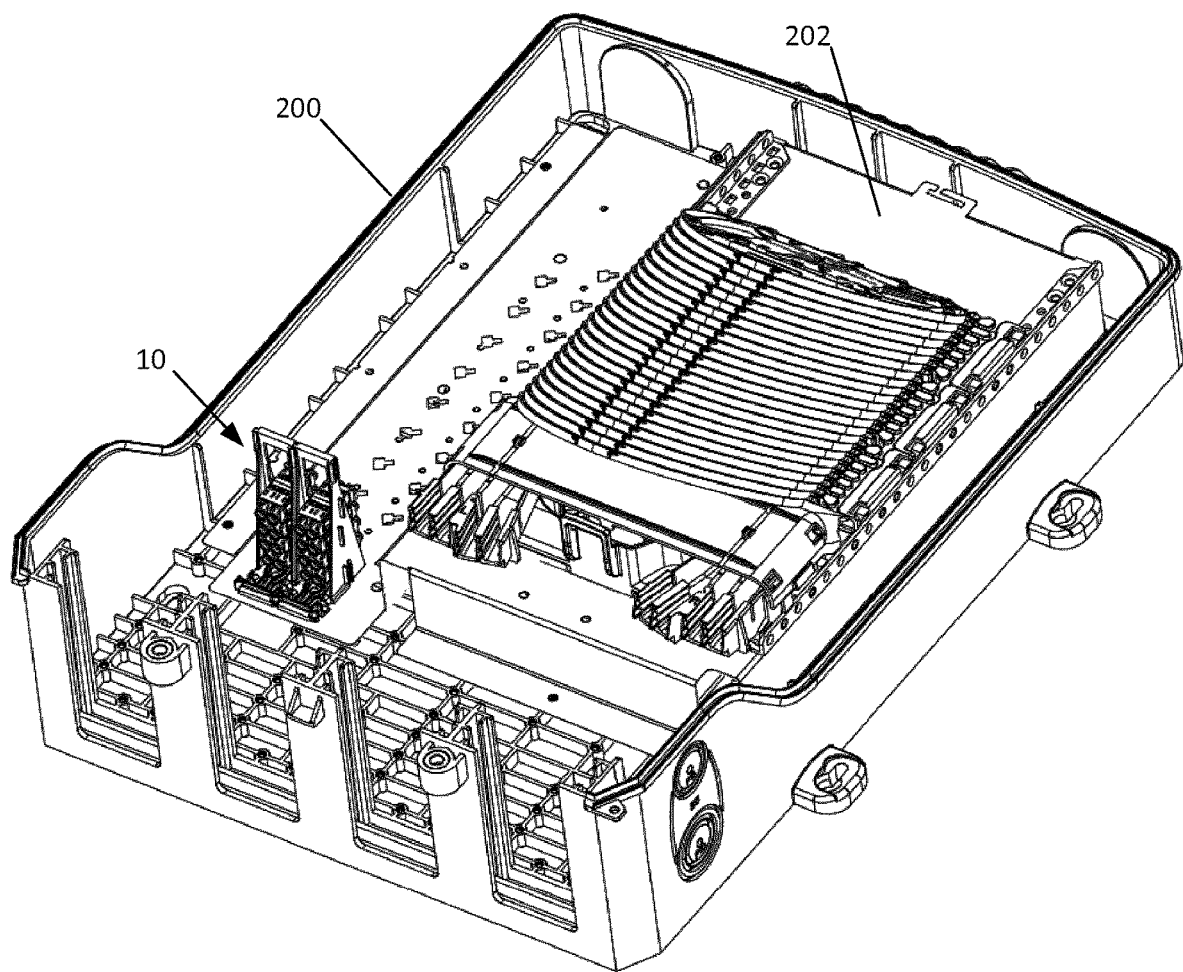
FIG. 15 is a perspective view of a telecommunications tray including the first extendable patch panel shown in FIG. 11.

Referring to FIGS. 11-12, a fully assembled patch panel 10 having connection parts 100a and 100b joined together is shown. Although two joined connection parts 100 are shown, any number of desired connection parts 100 can be joined together. As shown, the connection parts 100a and 100b are aligned together such that the front and back ends 103,105 are fully aligned along a common plane. Each of the connection parts 100a, 100b are shown as holding a plurality of fiber optic adapters 12. Referring to FIG. 15, the fully assembled patch panel 10 is shown as being installed in a telecommunications enclosure 200 which may be configured to hold other telecommunications components 202. As will be appreciated by one having skill in the art, the telecommunications enclosure 200 shown in FIG. 15 may be provided with a cover (not shown) and cable seals (not shown) to form an enclosed housing. The base 20 can be configured with a mounting surface 22 to provide a support surface for mounting telecommunications components 202, such as telecommunications cables, connectivity equipment, splices, splitters, wave division multiplexers, and terminations.

Figure 13:
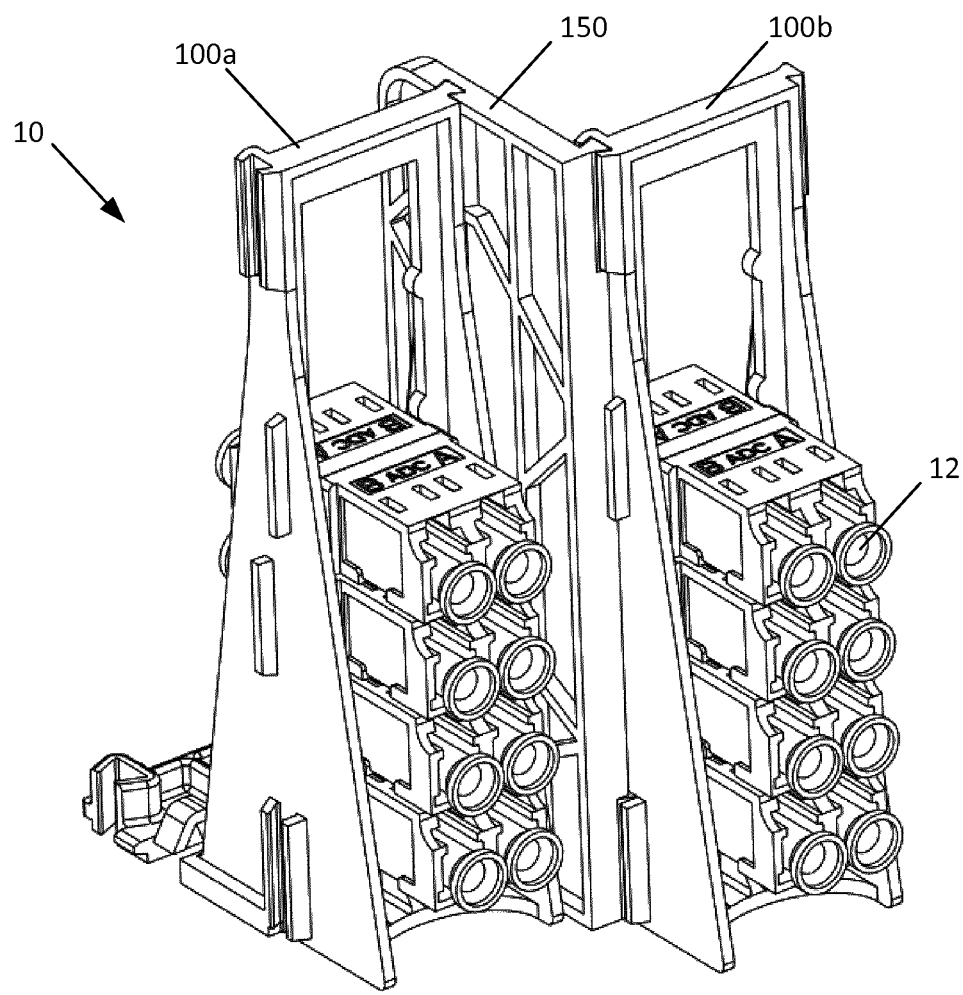
FIG. 13 is a perspective view of the second extendable patch panel shown in FIG. 10 with adapters installed into each connection part.
Figure 14:
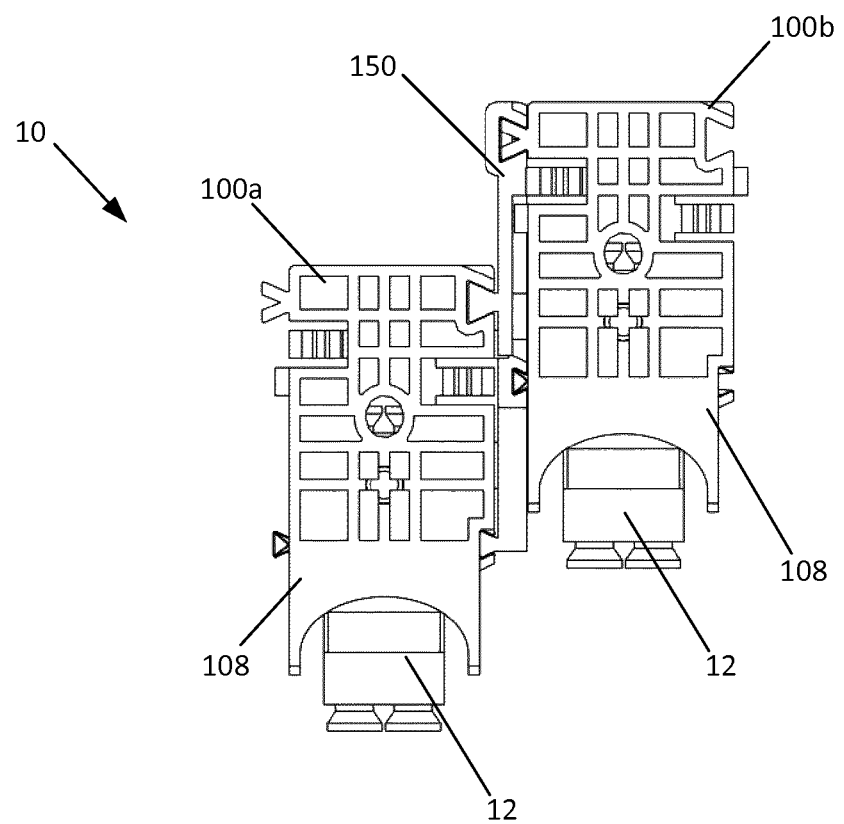
FIG. 14 is a bottom view of the second extendable patch panel shown in FIG. 13.

Referring to FIGS. 13-14, a staggered arrangement of a fully assembled patch panel 10 is shown having connection parts 100a and 100b adjoining an adapter 150. Although two joined connection parts 100 and a single adapter 150 are shown, any number of desired connection parts 100 and adapters 150 can be joined together. As shown, the connection parts 100a, 100b are staggered such that the front and back ends 103,105 are not aligned along a common plane. Each of the connection parts 100a, 100b is shown as holding a plurality of fiber optic adapters 12.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

PARTS LIST

| | |
|---|---|
| 10 | extendable patch panel |
| 12 | adapters |
| 100 | connection part |
| 102 | first side |
| 103 | front end |
| 104 | second side |
| 105 | back end |
| 106 | top end |
| 108 | bottom end |
| 110 | base portion |
| 112 | frame portion |
| 114 | aperture |
| 115 | retaining protrusions |
| 116 | first sidewall |
| 118 | second sidewall |
| 120a-f | support ribs |
| 122 | first connection feature |
| 122a | connection portion |
| 122b | connection portion |
| 122c | alignment structure |
| 124 | second connection feature |
| 124a | connection portion |
| 124b | connection portion |

-continued

PARTS LIST

| | |
|---|---|
| 124c | alignment structure |
| 124d | alignment structure |
| 126 | third connection feature |
| 126a | third connection portion |
| 128 | fourth connection feature |
| 128a | fourth connection portion |
| 130 | first lock feature |
| 132 | first spring clip |
| 132a | first spring clip free end |
| 134 | first stop surface |
| 136 | notched area in base |
| 140 | second lock feature |
| 142 | second spring clip |
| 142a | second spring clip free end |
| 144 | second stop surface |
| 146 | notched area in base |
| 150 | adapter part |
| 152 | first side |
| 154 | second side |
| 156 | stop |
| 160 | third lock feature |
| 162 | stop surface |
| 164 | stop surface |
| 200 | telecommunications enclosure |

We claim:

1. An extendable telecommunications patch panel comprising:
   a) a plurality of interconnectable connection parts, each of the connection parts having a first side and a second side, and including:
      i) an open frame portion extending between the first and second sides, the open frame portion defined as a sidewall with an aperture for receiving a plurality of telecommunications components;
      ii) a first connection feature located on the connection part first side; and
         a) a second connection feature located on the connection part second side;
         b) the first connection feature being configured to interlock with the second connection feature of an adjacent connection part.

2. The extendable telecommunications patch panel of claim 1, wherein:
   a) the first connection feature includes a first connection portion and a second connection portion; and
   b) the second connection feature includes a third connection portion and a fourth connection portion;
   c) wherein the first connection portion is configured to slidably engage with the third connection portion of an adjacent connection part;
   d) the second connection portion being configured to slidably engage with the fourth connection portion of the adjacent connection part.

3. The extendable telecommunications patch panel of claim 2, wherein:
   a) the first and second connection portions are configured as male tail portions and the third and fourth connection portions are configured as female socket portions to form a dovetail-type connection.

4. The extendable telecommunications patch panel of claim 1, further comprising:
   a) a first alignment structure located on the connection part first side; and
   b) a second alignment structure located on the connection part second side;

c) the first alignment structure being configured to engages with the second alignment structure of an adjacent connection part to guide the first and second connection features into engagement.

5. The extendable telecommunications patch panel of claim 4, wherein:
   a) the first alignment structure is configured as a continuous rib extending between the first and second connection portions.

6. The extendable telecommunications patch panel of claim 1, further comprising:
   a) a third connection feature located on the connection part first side; and
   b) a fourth connection feature located on the connection part second side;
   c) the third connection feature being configured to interlock with the fourth connection feature of an adjacent connection part.

7. The extendable telecommunications patch panel of claim 1, further comprising:
   a) a first lock feature located on the connection part first side; and
   b) a second lock feature located on the connection part second side;
   c) the first lock feature being configured to engage with the second lock feature of an adjacent connection part to lock adjacent connection parts together.

8. The extendable telecommunications patch panel of claim 7, wherein:
   a) the first lock feature includes a first spring clip and a first stop surface; and
   b) the second lock feature includes a second spring clip and a second stop surface.

9. The extendable telecommunications patch panel of claim 8, wherein:
   a) the first spring clip is configured to engage with the second stop surface of an adjacent connection part; and
   b) the second spring clip is configured to engage with the first stop surface of the adjacent connection part.

10. The extendable telecommunications patch panel of claim 1, wherein:
    a) the first connection feature is located directly across from the second connection feature such that the first and second connection features are disposed along a common plane.

11. The extendable telecommunications patch panel of claim 1, further comprising:
    a) an adapter configured for attachment to the first side of the connection part and attachment to the second side of an adjacent connection part.

12. The extendable telecommunications patch panel of claim 11, wherein:
    a) the adapter is provided with a first adapter connection feature on a first side, the first adapter connection feature being configured to engage with the second connection feature of the connection part; and
    b) the adapter is provided with a second adapter connection feature on a second side, the second adapter connection feature being configured to engage with the first connection feature of an adjacent connection part.

13. The extendable telecommunications patch panel of claim 12, wherein:
    a) the first adapter connection feature is offset from the second adapter connection feature to result in a staggered patch panel configuration.

14. The extendable telecommunications patch panel of claim 11, wherein:
    a) the frame portion of each of the connection parts includes an aperture for receiving one or more connectors.

15. The extendable telecommunications patch panel of claim 11, further comprising:
    a) a plurality of fiber optic adapters retained in each of the connection parts.

* * * * *